No. 692,196. Patented Jan. 28, 1902.
A. ESPINOSA.
PLANT THINNER.
(Application filed Mar. 18, 1901.)
(No Model.)
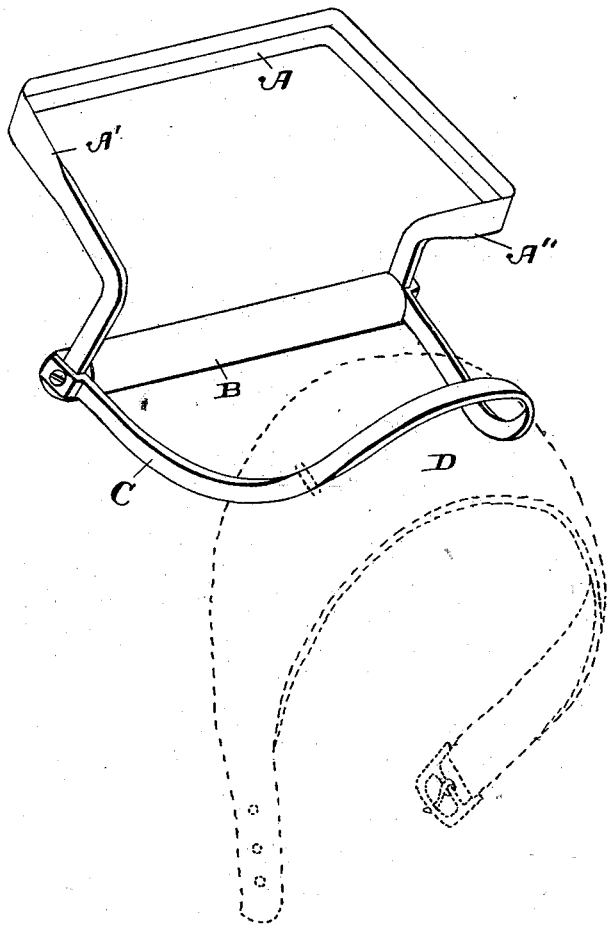
WITNESSES
Chas. L. Hyde.
Mattie M. Ginnis.
INVENTOR
Albert Espinosa
BY HIS ATTORNEYS
Hazard & Harpham
THE NORRIS PETERS CO., PHOTO-LITHO., WASHINGTON, D. C.

UNITED STATES PATENT OFFICE.

ALBERT ESPINOSA, OF VENTURA, CALIFORNIA, ASSIGNOR OF TWO-THIRDS TO THOMAS RUIZ AND FRANK ESPARANZA, OF VENTURA, CALIFORNIA.

PLANT-THINNER.

SPECIFICATION forming part of Letters Patent No. 692,196, dated January 28, 1902.

Application filed March 18, 1901. Serial No. 51,771. (No model.)

*To all whom it may concern:*

Be it known that I, ALBERT ESPINOSA, a citizen of the United States, residing at Ventura, in the county of Ventura and State of California, have invented a new and useful hand implement for thinning out plants when they are too thickly planted in the drills and at the same time to loosen the soil around the plants remaining after some have been thinned out, of which the following is a specification.

This implement, although especially adapted for use in thinning out the beet-plants when too thickly growing in the rows, is adapted for like use with other plants that require thinning; and the object of my invention is to provide a simple implement which can be attached to the hand and always ready to be used, but is not in the way in using the fingers in cleaning out plants and weeds that cannot be safely removed with the implement. I accomplish this object by means of the device described herein and shown in the accompanying drawing, which is a perspective view of my plant-thinner, the leather wrist protector or shield (by means of which the implement is secured to the wrist) being shown in dotted lines.

In the accompanying drawing, A represents a steel cutting-frame carrying a double cutting edge from the points thereon marked A' to the point marked A''. This steel cutting-frame is removably attached to the handle B, adapted to be gripped in the right hand. Projecting rearwardly from the ends of the handle and adapted to pass over and around the upper part of the wrist is the wrist-engaging extension C. This extension is rigidly affixed to the cutting-frame at the point where the handle is secured and forms a brace resting upon the upper part of the wrist. Secured to this wrist-engaging projection is a leather shield D. (Shown in dotted lines in the drawing.) This shield is detachably secured to the extension and adapted when in place to lie between the wrist and the extension. This leather shield projects downwardly at each end thereof and terminates at one end in a buckle attached thereto and at the other end in a narrow strap adapted to engage said buckle, by means of which the device is removably clasped to the wrist. It will be manifest that when the device is thus secured to the wrist and the handle resting in the palm of the hand the fingers will be free and untrammeled and may be used in thinning the plants the same as if the cleaner were not secured to the wrist. The plant-thinner being thus secured to the wrist, the handle resting in the palm of the hand, the cutting edges of the frame being passed through the ground in which the plants desired to be removed are growing, it will not only cut and destroy the plant which it is desirable to remove, but it will loosen and stir the ground around and adjacent to the plants which are left.

In practicing my invention it is not necessary that the device should be made of four parts A, B, C, and D, as I have shown them; but all these parts may be made in one piece of metal and rigidly secured together, practically in the shape shown, or the leather part D may be a separate part, the other three parts being made in one solid piece, without departing from the spirit of my invention.

Having described my invention, what I claim as new, and desire to secure by Letters Patent, is—

1. A device to thin plants, comprising a double-edged cutting-frame detachably secured to a handle, adapted to be gripped by the hand; a wrist-engaging protector rigidly secured to the cutting-frame in combination with a flexible shield attached to protector and adapted to rest on the upper part of the wrist.

2. An implement to thin plants, comprising a frame having a cutting edge on one side, and a wrist-engaging portion on the other side; a handle adapted to be gripped, by the hand, in the middle; a flexible wrist-protector secured to the wrist-engaging portion.

3. A device to thin and cultivate plants, comprising a frame, one end of said frame having a double cutting edge; the other end being bow-shaped to engage and fit the wrist; a handle between the cutting edge and the wrist-engaging portion, and a leather shield secured to the wrist-engaging portion, having two projecting ends, one end terminating in a buckle, and at the other end in a strap adapted to be secured in said buckle.

4. A device to thin plants, comprising a central handle; a cutting portion projecting forwardly from the handle and having a double cutting edge; a wrist-engaging portion projecting rearwardly from said handle, and shaped to pass over and around the wrist; the said cutting portion and the wrist-engaging portion being rigidly and detachably connected together; a leather shield secured to the wrist portion and arranged to secure said device to and to protect the wrist.

In witness that I claim the foregoing I have hereunto subscribed my name this 2d day of March, 1901.

A. ESPINOSA.

Witnesses:
HENRY T. HAZARD,
MATTIE MCGINNIS.